United States Patent [19]

Chiles et al.

[11] 4,012,957
[45] Mar. 22, 1977

[54] SHROUDED FLOWMETER TURBINE AND IMPROVED FLUID FLOWMETER USING THE SAME

[75] Inventors: William E. Chiles, Woodinville; LeRoy E. Vetsch, Lynnwood; Jack V. Peterson, Seattle, all of Wash.

[73] Assignee: Eldec Corporation, Lynnwood, Wash.

[22] Filed: Apr. 27, 1976

[21] Appl. No.: 680,856

[52] U.S. Cl. .............................................. 73/231 R
[51] Int. Cl.² ........................................... G01F 1/10
[58] Field of Search ............ 73/231 R, 231 M, 229; 415/170 A, 170 R, 172 A

[56] References Cited
UNITED STATES PATENTS

| | | | |
|---|---|---|---|
| 1,535,612 | 4/1925 | Losel | 415/172 A X |
| 2,832,218 | 4/1958 | White | 73/194 |
| 3,049,917 | 8/1962 | Alspach et al. | 73/194 |
| 3,613,451 | 10/1971 | Scott | 73/231 M |
| 3,877,304 | 4/1975 | Vetsch | 73/231 M |

*Primary Examiner*—James J. Gill
*Attorney, Agent, or Firm*—Christensen, O'Connor, Garrison & Havelka

[57] ABSTRACT

A fluid flowmeter, of a type including a housing and a fluid flow measurement assembly rotatable therein which is driven by a turbine, is described in detail to illustrate a limitation on low flow rate operational capability and a related problem of contaminant particle malfunctions. A specific flowmeter used for such illustration is a typical prior art motorless mass flowmeter including a turbine secured to and rotatable with a shaft which in turn rotates a downstream impeller by means of a spring, the impeller being independently supported for rotation, so that relative deflection between the impeller and the shaft is a measure of mass flow rate. To minimize fluid leakage around a peripheral surface of the turbine in proximity to the housing in order to achieve low flow rate operation, while yet avoiding stoppage of the turbine due to contaminant particles being lodged in or near the leakage path, a shroud member is utilized upstream of the turbine which comprises a hollow member of revolution rotatable with the turbine which has a first end secured to the turbine, in a fluid-tight seal, at points radially outward of a plurality of turbine drive means in the turbine and which tapers to a second end, proximate to a fluid inlet opening, to form a rotatable fluid seal with a sealing means surrounding the fluid inlet opening.

11 Claims, 7 Drawing Figures

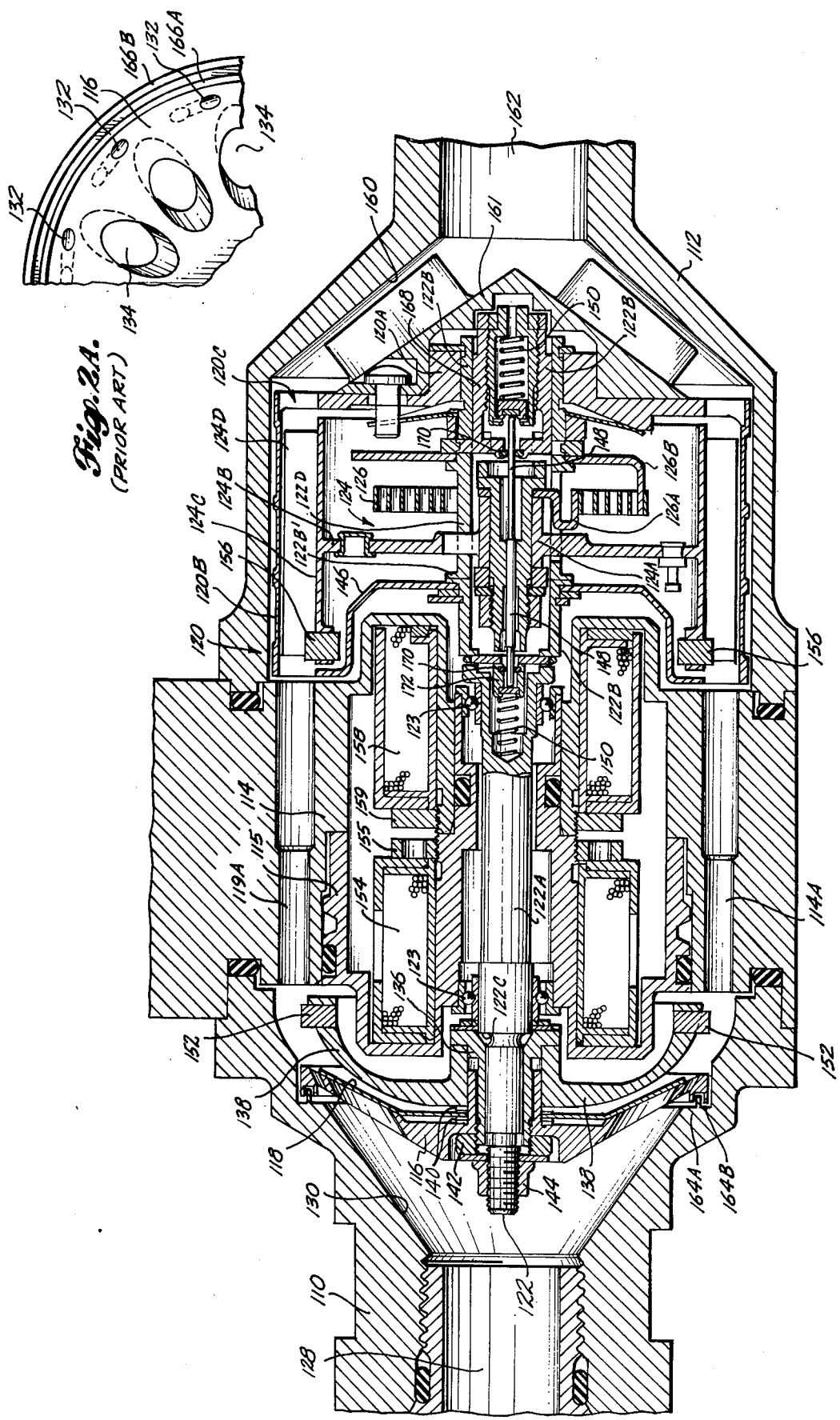

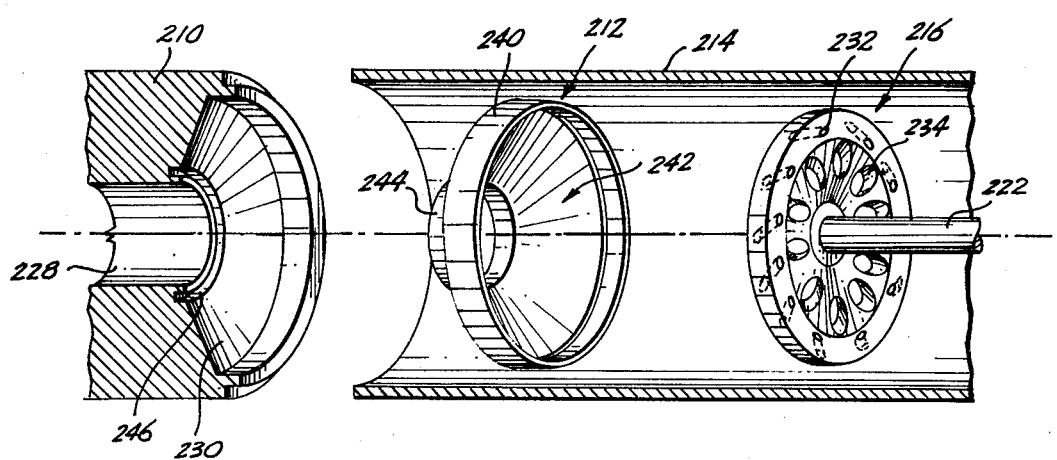
Fig. 4.
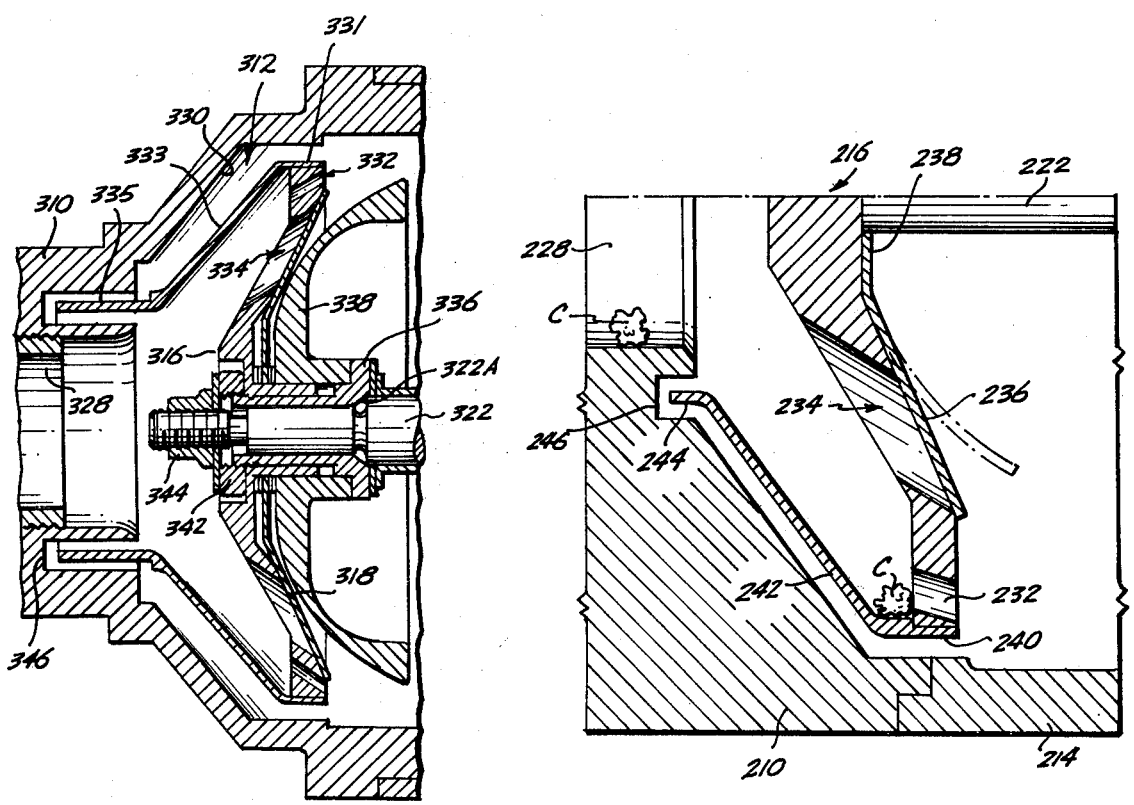
Fig. 5.
Fig. 6.

SHROUDED FLOWMETER TURBINE AND IMPROVED FLUID FLOWMETER USING THE SAME

FIELD OF THE INVENTION

This invention generally relates to fluid flow measuring apparatus, and more particularly, to such apparatus utilizing a rotatable measurement assembly including a member reacting with the fluid whose flow is to be measured.

BACKGROUND OF THE INVENTION

Fluid flowmeters of various types are known to the prior art for measuring the flow rate of a moving fluid contained within a conduit. Such flowmeters find particular applicability, for instance, in the aircraft industry in measuring the flow rate of fuel delivered to a jet engine.

The fluid flowmeters with which the present invention is particularly concerned are those including a rotatable measurement assembly contained within a housing which is adapted for interconnection into the conduit through which the fluid is flowing. These flowmeters include volumetric types, in which the measurement assembly comprises a turbine having a plurality of turbine drive surfaces which are angled with respect to the direction of fluid flow through the housing so that the turbine is rotated by the fluid at a velocity proportional to the volumetric flow rate of the fluid.

Also known to the prior art are mass flow rate flowmeters, one of which includes a measurement assembly comprising a rotatable first member, a second member or impeller for imparting angular momentum to the fluid, and a resilient spring member interconnecting the first and second members. The angular displacement between the first and second members is then used to provide desired information regarding mass flow rate of the fluid. The first member may be driven either by a motor drive assembly, or, by the fluid itself through a turbine connected to the first member. The latter type of mass flowmeter, also known as a motorless mass flowmeter, is seen in U.S. Pat. No. 3,877,304, to Vetsch, issued on Apr. 15, 1975 to the assignee of the present invention.

With respect to volumetric flowmeters and motorless mass flowmeters, the ability of such devices to operate at extremely low flow rates is dependent upon the torque able to be developed by the turbine therein. A significant limitation upon this torque is leakage of the fluid between the peripheral surface of the turbine and the surrounding housing. To reduce the amount of leakage occurring in this manner, it is desirable to reduce the clearance between the turbine's peripheral surface and the housing to a minimum value. This minimum value, however, is limited by dimensional tolerances of the turbine and the housing, inasmuch as the turbine must rotate within the housing without restriction. Further, significant reduction of the clearance presents a more difficult problem in that contaminant particles normally present in any fluid, and particularly present in aircraft fuel supplies, become trapped between the turbine's peripheral surface and the housing, resulting in many cases in stoppage of further rotation of the turbine and consequent malfunction of the flowmeter.

It is therefore an object of this invention to provide an improved fluid flowmeter, of a type including a rotatable member reacting with the fluid whose flow is to be measured, such as a turbine forming part of a measurement assembly, which is capable of operation at very low flow rates.

It is a further object of this invention to provide such an improved fluid flowmeter which, while capable of operation at very low flow rates, has a greatly reduced susceptibility to malfunction due to contaminants present in the fluid.

SUMMARY OF THE INVENTION

Briefly, the invention resides in an improved flowmeter which comprises a housing means defining therein a fluid measurement chamber and further including fluid inlet means and fluid outlet means situated, respectively, at opposite ends of the fluid measurement chamber for admitting fluid into and removing fluid from the fluid measurement chamber. The fluid inlet means defines an inlet opening having a predetermined cross-sectional area. A fluid reaction means is mounted within the fluid measurement chamber for rotation about an axis of revolution substantially aligned with the inlet opening and is spaced apart from the inlet opening in the direction of fluid flow through the fluid measurement chamber. The fluid reaction means has a cross-sectional area in a direction transverse to the direction of fluid flow which is greater than the predetermined cross-sectional area of the inlet opening. The fluid reaction means further includes a plurality of fluid reaction surfaces located radially outward of the axis of revolution for imparting rotational movement to the fluid reaction means. A shroud means is rotatable with the fluid reaction means and comprises a hollow member of revolution having a first end coupled to the fluid reaction means at points radially outward of the plurality of fluid reaction surfaces. The shroud means tapers from the first end to a second end located in proximity to the inlet opening. The fluid inlet means further includes sealing means surrounding the inlet opening for providing a rotatable fluid seal with the second end of the shroud means.

BRIEF DESCRIPTION OF THE DRAWINGS

The above and additional advantages and objects of the invention will be more clearly understood from the following description, when read with reference to the accompanying drawings, in which:

FIG. 2 is a detailed cross-sectional view of a prior art motorless mass flowmeter;

FIG. 2A is a front elevational view of a portion of the turbine included in the flowmeter of FIG. 2;

FIG. 4 is a schematic illustration of the present invention as applied to a motorless mass flowmeter;

FIG. 5 is a detailed cross-sectional view of a preferred embodiment of the invention; and FIG. 6 is a schematic cross-sectional view illustrating the effect of contaminant particles upon a motorless mass flowmeter including the present invention.

DESCRIPTION OF A PREFERRED EMBODIMENT

Figure 1:
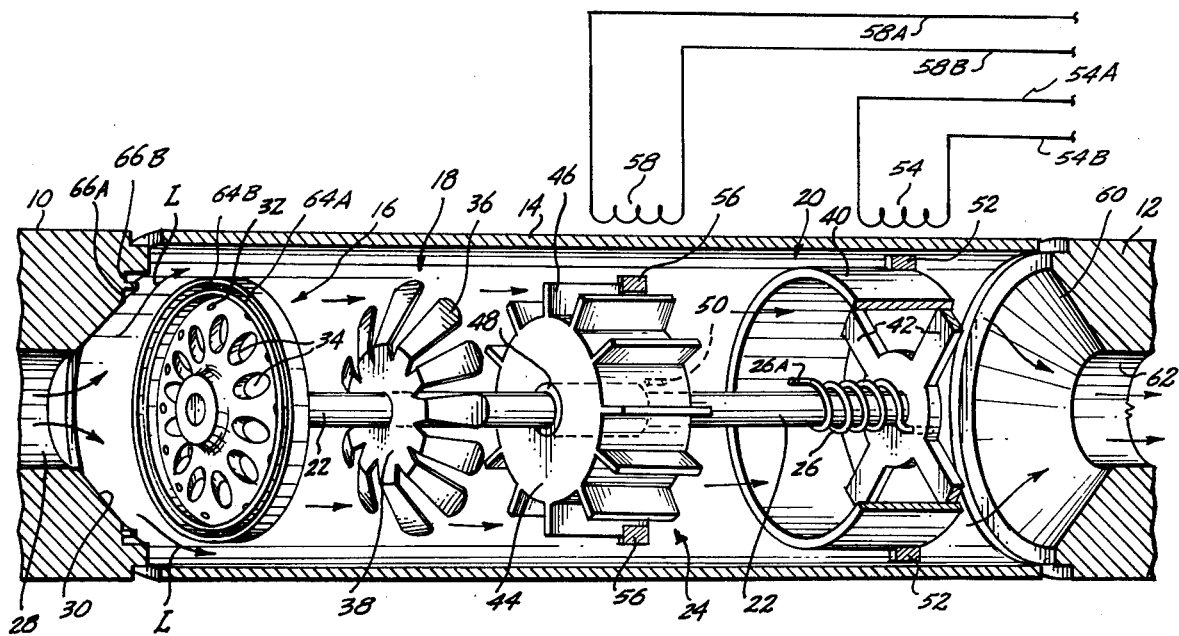
FIG. 1 is a schematic illustration of a prior art motorless mass flowmeter.
Figure 3:
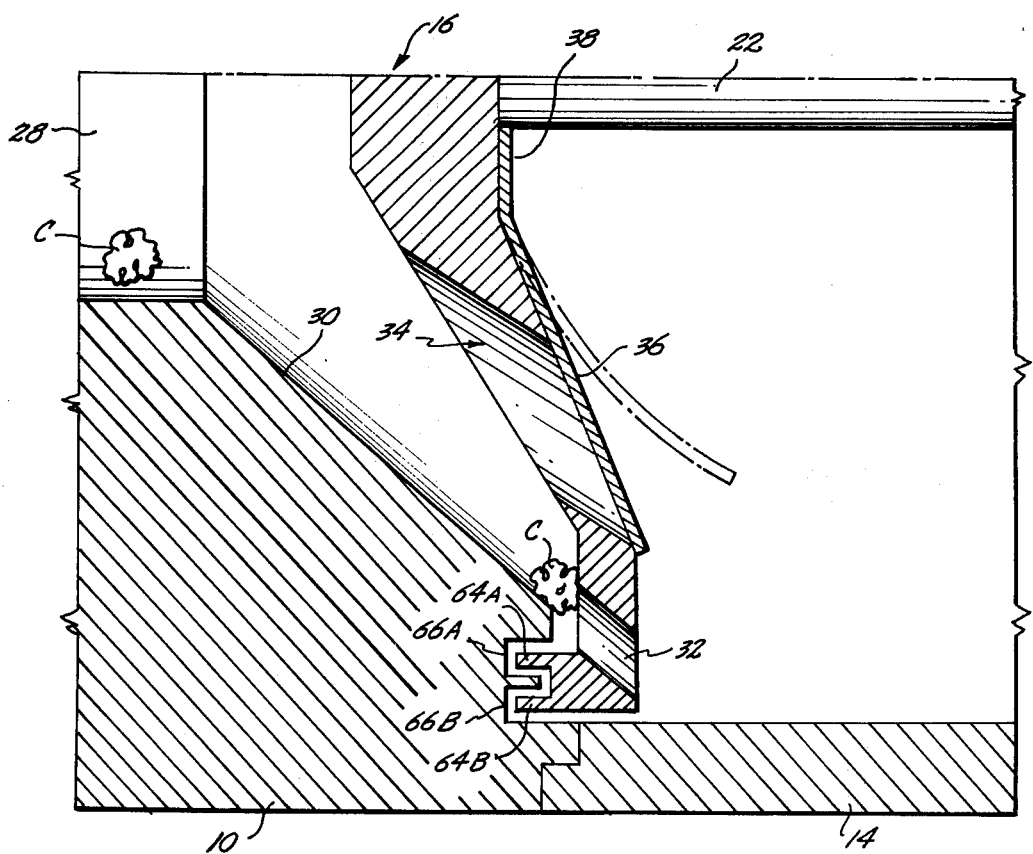
FIG. 3 is a schematic cross-sectional view illustrating the effect of contaminant particles upon the operation of the prior art motorless mass flowmeter.

Referring now to FIGS. 1–3, prior art motorless flowmeters will be described in detail in order to more fully explain the related problems of low flow rate operational limitations and contaminant particle malfunction. It is to be clearly understood by those skilled in the art, however, that the invention to be described hereinafter finds equal applicability to other types of mass and volumetric flowmeters including a rotatable fluid reaction element which has a plurality of fluid reaction surfaces for imparting rotational movement to the fluid reaction element. One example would be those volumetric flowmeters utilizing a rotating turbine. Another example would be those mass flowmeters including a fixed swirl generator at an inlet opening for inducing rotation in the fluid and a downstream, rotatable element having a plurality of axial surfaces for reacting with the rotating fluid.

In FIG. 1, the fluid whose flow rate is to be measured is conducted, via means not illustrated, to an inlet fitting 10, which, together with an outlet fitting 12 and a housing member 14, define a fluid measurement chamber in which is contained and supported the fluid measurement assembly.

Included in the fluid measurement assembly are a turbine 16, a valve member 18, and a drum 20, all supported on and rigidly attached to a common shaft 22 which is supported for rotation, by means not illustrated, from the housing 14. The turbine 16, valve member 18, drum 20 and shaft 22 accordingly rotate as a unit and may be termed a first member. A second member completes the measurement assembly, this second member comprising an impeller 24 which is rotatable on shaft 22 and which is interconnected with the drum 20 by means of a spring 26.

Such a structure is generally similar to that described and claimed in the aforementioned U.S. Pat. No. 3,877,304 to which reference should be made for further details thereof.

More specifically, the fluid conducted to the inlet fitting 10 passes through an inlet 28 and thence is directed by an adjacent transition surface 30 into the fluid measurement chamber, where it first encounters a substantially cylindrical disk including a plurality of equiradial turbine drive apertures 32 spaced around the disk which extend through the disk and which are angled with respect to the axis of revolution of the measurement assembly, that defined by shaft 22, and accordingly with respect to the direction of fluid flow. As the fluid passes through the turbine drive apertures 32, it impinges what might be termed turbine drive surfaces, or more generally, fluid reaction surfaces, defining the apertures 32 to accordingly impart a rotational force on the turbine 16 related to the mass and velocity of the fluid, and the radial distance of the apertures 32 from the axis of revolution.

The turbine 16 also includes a plurality of equiradial turbine bypass apertures 34, extending through the turbine 16 in a direction generally parallel to the axis of revolution and thus to the direction of fluid flow, which are normally blocked by the valve member 18. As described in more detail in the aforesaid U.S. Pat. No. 3,877,304, the valve member 18 includes a central hub portion 38 and a plurality of leaf spring members 36 overlying corresponding ones of the plurality of turbine bypass apertures 34. At low flow rates, the valve member 18 is closed. As the flow rate increases, the leaf springs 36 deflect away from the turbine bypass apertures 34 in response to an increase in pressure drop across the turbine to accordingly bypass a portion of the fluid through the turbine bypass apertures 34 instead of through the turbine drive apertures 32. As a result, the rotational force on the turbine 16 is maintained approximately constant to keep a substantially constant rotational velocity thereof to permit the flowmeter to measure widely varying flow rates.

The fluid, after passing the assembly of the turbine 16 and the valve member 18, passes through a plurality of flow straighteners, not illustrated, which remove any rotational movement of the fluid, and next encounters the impeller 24 which, in assembly is contained within the drum 20 and protected thereby from viscous drag with the housing 14. The drum includes a central support spider 42 which is affixed to the shaft 22 and which in turn supports a hollow cylindrical member 40 extending over the impeller 24.

Included in the impeller 24 is a central hub 44 which has located, on a peripheral surface thereof, a plurality of spaced-apart impeller blades 46 extending parallel to the axis of revolution of the measurement assembly. The impeller 24 is supported by a bearing means 48 on the shaft 22 and includes an aperture 50 receiving one end 26A of spring 26 connected to drum 20, and thus to shaft 22.

As will be appreciated, due to the interconnection provided by the spring 26, the impeller 24 will be rotated at the same speed as the shaft 22. However, a force is required to rotate the impeller 24 in the path of the fluid due to the interaction of the impeller blades 46 with the fluid. Since this force must be transmitted from the shaft 22 to the impeller 24 through the spring 26, the spring 26 deflects so that the impeller 24 lags the shaft 22 (and the other elements interconnected therewith comprising the first member including the drum 20). If the spring 26 is designed to have a linear force/deflection characteristic, the deflection angle, or lag between the first and second members, or relative angular deflection of the drum 20 and the impeller 24, is a measure of this force. The force itself is directly related to the mass flow rate of the fluid and the angular speed of rotation of the measurement assembly.

The greater the mass flow rate, the larger the time lag between corresponding points on the impeller 24 and the drum 20, considered with respect to a common, fixed reference point. This time lag is conveniently measured by attaching a plurality of magnets 52 and 56 to the drum 20 and impeller 24, respectively, and placing in proximity thereto, and mounted in the housing 14, two pick-off coils 54 and 58. If the magnets 52 and 56 are aligned in a direction parallel to the axis of revolution at zero flow rates, then the time differences between pulses induced in "impeller" coil 58 with respect to pulses induced in "drum" coil 54 are a direct measure of the mass flow rate. These pulses may be coupled by leads 58A, 58B, and 54A, 54B, respectively, to electronic signal processing circuits forming no part of the present invention. One such circuit is disclosed in U.S. Pat. No. 3,740,586, June 19, 1973, Banks et al., and issued to the assignee of the present invention.

After passing through the drum 20, the fluid is then directed by an outlet transition surface 60 to an outlet aperture 62, both located within and defined by outlet fitting 12 which is interconnected with the fluid conduit in which the flowmeter is located.

As noted previously, the rotational torque developed by the turbine 16 is related to both the mass and velocity of the fluid. At low flow rates (involving low fluid velocities) the mass of the fluid available to drive the turbine through the turbine drive apertures 32 becomes a limiting factor in the ability of the turbine 16 to rotate the measurement assembly. As seen in FIG. 1, a leakage path illustrated by arrows L exist between the peripheral surface of the turbine 16 and the surrounding housing 14. Any fluid that passes through this leakage path accordingly is not available to drive the turbine 16. Two solutions to this problem have been known to the prior art. The first is typified with flowmeters of the type illustrated in the aforementioned U.S. Pat. No. 3,877,304, in which the radial clearance between the turbine peripheral surface and the surrounding housing is reduced to an absolute minimum. The second is typified in FIG. 1 (and in FIG. 3 in cross-sectional view) which provides operation at lower flow rates than with the device illustrated in U.S. Pat. 3,877,304. This approach includes the provision of a labyrinth seal at the periphery of the turbine 16 and spaced outwardly from the turbine drive apertures 32, the labyrinth seal including first and second annular rings 64A, 64B on the front surface of the turbine 16 which are received in and spaced apart from corresponding first and second annular recesses 66A, 66B in the inlet fitting 10. Such a labyrinth seal increases the distance that fluid must take through the leakage path L and, accordingly, increases the pressure drop through the leakage path L to reduce the amount of fluid passing therethrough.

Reference should now be made to FIG. 2 for a description of an actual motorless mass flowmeter of the type schematically illustrated in FIG. 1.

The flowmeter is seen to comprise an inlet fitting 110, and an outlet fitting 112 interconnected and sealed with first and second sections 114, 115 of a central housing and frame member and thereby defining therein a fluid measurement chamber through inlet opening 128 in which may be situated a flow straightener, not illustrated, to remove angular swirl in the fluid. An inlet transition surface 130 of increasing cross-sectional area in the direction of fuel flow causes the fluid to be then directed against a drive turbine 116 whose front surface has a larger cross-sectional area than the cross-sectional area of the inlet opening 128, in a direction transverse to the direction of fluid flow. Drive turbine 116 has defined therein a plurality of angled turbine drive apertures 132 and a plurality of turbine bypass apertures 134 (FIG. 2A). A labyrinth seal is provided at a peripheral surface of the drive turbine 116 by first and second annular rings 166A, 166B which are received in and separated from corresponding first and second annular recesses 164A, 164B in the inlet fitting 110 and adjacent to the termination of the inlet transition surface 130.

The drive turbine 116 is secured to a shaft 122, a central portion 122A thereof being supported for rotation from first and second sections 114, 115 of the central housing and frame member by bearings 123 supported in suitable races.

A sleeve 136 is passed over the upstream end of shaft 122 and bears against a shoulder 122C thereof. Sleeve 136 in turn has positioned thereon a valve stop cone member 138. A plurality of spacers 140 are placed around the upper end of shaft 122 upstream of cone member 138 and additionally around a central hub portion of the turbine 116 to space turbine 116 from valve stop cone member 138 and to additionally press a valve member 118 against the rear surface of turbine 116 when turbine 116 is positioned on shaft 122, as illustrated. A nut 142 is threaded onto a threaded portion of sleeve 136 to maintain the turbine 116, a valve member 118, valve stop cone member 138 and sleeve 136 in assembly. This assembly, in turn, is maintained on shaft 122 by an end cap 144 threaded on a threaded end of shaft 122 and bearing against nut 144 through an appropriate washer.

After leaving the vicinity of the turbine assembly, the fluid in the fluid measurement chamber is then passed through a plurality of equiradial flow straightening passages 114A in section 114 which extend parallel to the axis of revolution defined by shaft 122 and then enters the region of the fluid measurement chamber including the impeller and drum assembly.

A plurality of magnets 152 are located in the valve stop cone member 138 and serve to induce "drum" or "first member" pulses in an underlying coil 154 contained within and supported by section 115. A nut 155 is threaded on section 115 and maintains coil 154 in position.

The down stream end of the shaft 122 is bifurcated into two tines 122B whose ends are supported on an impeller bearing support member 168. A central hub 124A of an impeller 124 is supported within the bifurcated portion of shaft 122 on a central shaft 148 rotatable within jewel bearings 170 within bearing mounts 172, in turn supported within a hollowed-out end of central portion of 122A of shaft 122, and the bearing support member 168. Coil springs 150 located within central shaft portion 122A and bearing support member 168 serve to protect the jewel bearings 170 in event of undue shock.

The impeller 124 includes two central strut portions 124B attached to the central hub 124A and extending through apertures 122D defined by the tines 122B. The central strut portions 124B are integral with and support a hollow cylindrical member 124C on which are located a plurality of impeller blades 124D.

The drum 120 has a central portion 120A which is positioned onto the ends of tines 122B of shaft 122 and supports, through intermediate, integral support members, a hollow cylindrical member 120B overlying the impeller 124 and thereby providing viscous decoupling between the impeller blades 124D and the adjacent housing walls in end fitting 112. Additional viscous decoupling from the section 114 of the central housing and frame member is provided by a viscous decoupling disk 146 maintained in position against integral shoulders 122B' of tines 122B immediately upstream of impeller 124.

A spiral torsion spring 126 is located around the bifurcated portion of shaft 122 and has a first end attached to central hub 124A of impeller 124 by a connecting member 126A and a second end attached to the shaft 122 by a connecting member 126B pressed between downstream shoulders 122B" of tines 122B and central portion 120A of drum 120. The fluid exiting from the flow straightening passages 114A thereby reacts with the impeller blades 124D to cause relative angular deflection of the impeller 124 with respect to the drum 120, and accordingly shaft 122 and the elements connected thereto including the valve stop cone member 138. This deflection is measured by the provision of a plurality of magnets 156 located in the hollow cylindrical member 124C of impeller 124 and overlying a pickup coil 158 contained within and supported by the section 114. A nut 159 is threaded onto section 114 to maintain coil 158 in place.

After exiting from the impeller 124, the fluid passes through apertures 120C in the drum 120 and then is directed by an outlet transition surface 160 in the outlet fitting 112 to a reduced-diameter outlet aperture 162. A member 161 is affixed to and supported by the central portion 120A of drum 120 and has located thereon, in proximity to the outlet transition surface 161, a plurality of energy recovery vanes which recover a portion of the angular momentum imparted to the fluid by the impeller in the form of driving energy for the shaft 122.

As can be readily visualized from an inspection of FIG. 2, the provision of a labyrinth seal radially outward of the turbine drive apertures 132, and the close radial and axial clearances between the components of that labyrinth seal including rings 166A, 166B and recesses 164A, 164B, effectively reduce fluid leakage around the turbine 116 to permit lower flow rate operation of the flowmeter.

However, as can now be visualized from a review of FIG. 3, which can be related to the schematic flowmeter illustrated in FIG. 1, the provision of such a labyrinth seal, or any other sealing arrangement designed to prevent leakage around the periphery of the drive turbine necessarily resulting in close dimensional tolerances between the rotating turbine and the adjacent housing wall, introduces a serious problem of turbine malfunction due to contaminant particles.

In FIG. 3, a contaminant particle C enters the flowmeter through the inlet opening 28 and is funneled by the inlet transition surface 30 to a position in the vicinity of the periphery of the turbine 16. If the contaminant particle C has a diameter approximating any of the clearances in the labyrinth seal, it may become wedged in the seal and therefore occasion stoppage of the turbine 16. An additional problem is encountered with particles whose diameter approximates that of the clearance between the front face of the turbine 16 and the adjacent portion of the inlet fitting surface. As particularly indicated in FIG. 3, such particles often become wedged between the turbine 16 and the inlet fitting 10.

With increasing diameter in the contaminant particles C, similar stoppage of the turbine 16 may result due to wedging of the particles between the front face of the turbine 16 and the inlet transition surface 30. At higher flow rates, the valve member 36 would deflect away from the turbine bypass apertures 34, as indicated by the dashed lines in FIG. 3, thereby permitting some of the contaminant particles to pass through the large diameter turbine bypass apertures 34. However, as such bypass is not available and not desirable at low flow rates in order to maintain maximum drive torque to the turbine 16, turbine stoppage is often encountered.

With reference now to FIGS. 4-6, the preferred embodiment of the invention will be discussed which permits even lower flow rate operation than with the prior art motorless flowmeter previously described and which yet is virtually unsusceptible to turbine stoppage by contaminant particles.

In FIG. 4, an inlet fitting 210 is provided for interconnection with a housing member 214 and an outlet fitting, not illustrated, to define a fluid measurement chamber. The inlet fitting 210 defines therein a centrally located inlet aperture 228, and an inlet transition surface 230 increasing in cross-sectional area in a direction transverse to the direction of fluid flow from the inlet aperture 228. A turbine 216 is provided and mounted on a shaft 222, which in turn is connected to the remainder of the measurement assembly, not illustrated, which is identical to that of the prior art. The turbine 216 is substantially similar to the turbine 16 illustrated in FIG. 1, with the exception that the first and second annular rings 64A, 64B forming part of the labyrinth seal are not provided. As such, the turbine 216 includes a plurality of turbine drive apertures 232 and a plurality of turbine bypass apertures 234. A shroud member 212 is provided which comprises a hollow member of revolution including a cylindrical portion 240, of a diameter substantially equal to that of the diameter of the peripheral surface of turbine 216, a reduced-diameter cylindrical portion 244, of a diameter slightly larger than that of the inlet opening 212, and an intermediate transition portion 244 which tapers from the cylindrical portion 244 to the cylindrical portion 240 with a funnel-like configuration. The cylindrical portion 240 is fitted over and affixed to the peripheral surface of turbine 216 to form a fluid tight seal therewith. The cylindrical portion 244 of shroud 212 is received, in assembly, in a corresponding annular recess 246 surrounding the inlet aperture 228.

It will then be appreciated by those skilled in the art that fluid entering the flowmeter through the inlet aperture 228 is directed by the shroud member 212 to the turbine drive apertures 232, with a labyrinth seal to achieve low flow rate operation being provided by the combination of the end of cylindrical portion 244 of shroud 212 and the corresponding surfaces in inlet fitting 210 defining annular recess 246.

Referring now to FIG. 5, an adaptation of the invention, to an actual flowmeter of the type illustrated in FIG. 2, includes an inlet fitting 310 having defined therein a centrally located fluid inlet opening 328 having a predetermined cross-sectional area in a direction transverse to the direction of fluid flow therethrough. Within a fluid measurement chamber, defined in part by the inlet fitting 310, is located the measurement assembly comprising a shaft 322 supported for rotation in a manner similar to that illustrated with respect to FIG. 2 and having located thereon a sleeve 336 abutting a shoulder 322A. The assembly also includes, in a manner similar to the prior art, a valve stop cone member 338, a valve member 318, and a turbine 316 maintained in assembly by a nut 342, the assembly being retained on shaft 322 by a threaded end cap 344.

A shroud member 312 comprises an integral, hollow member of revolution and includes a cylindrical portion 331 having a diameter slightly larger than the diameter of the peripheral surface of turbine 316 so as to allow shroud 312 to be press-fitted thereon. Also included in shroud 312 is a transition portion 333 whose cross-sectional area in a direction transverse to the direction of fluid flow tapers in a direction of fluid flow in a manner similar to that of an inlet transition surface 330 of the inlet fitting 310. The transition portion 333 terminates in a cylindrical portion 335, a substantial portion of which is received in but spaced apart from a corresponding annular recess 346 which surrounds inlet opening 328 in the inlet fitting 310.

It will be appreciated by those skilled in the art that the use of a shroud member, such as shroud members 212 and 312 in FIGS. 4 and 5, can provide a significant improvement in the low flow rate measurement capability of the flowmeter. If the turbine 316 has the same cross-sectional area as the prior art turbine 116 (FIG. 2), and if the turbine drive apertures 332 therein are located at the same radial positions as are the turbine drive apertures 132 (FIG. 2) of the prior art, then the torque characteristic of the turbines 316 and 116 should be identical, that is, their rotational speed will depend only upon the mass and velocity of the fluid flowing therethrough. With the use of a shroud member or other means tapering to a reduced-diameter portion forming part of a labyrinth seal adjacent the inlet opening, the area of the leakage through the labyrinth seal is reduced from that of the prior art. For example, assuming a prior art turbine, such as shown in U.S. Pat. No. 3,877,304, having a diameter of 1.00 inch, and a radial clearance between the turbine peripheral surface and the adjacent housing wall of .02 inch, the leakage area for the leakage path around the turbine is approximately .062 square inch. For a turbine constructed as illustrated in FIG. 5, with a peripheral surface diameter again of 1.00 inch, and a shroud member tapering to a cylindrical portion having a diameter of 0.5 inch, the leakage area is reduced to 0.031 square inch. It can be shown that the resultant torque on such a turbine using a shroud member is greater than twice that with the prior art turbine.

The torque can be even further increased by increasing the length of the leakage path through the labyrinth seal by providing a second cylindrical portion on the shroud member received and rotated in a second annular recess surrounding the inlet opening.

With reference now to FIG. 6, which can be related to the schematic flowmeter illustrated in FIG. 4, a contaminant particle C entering the flowmeter through the inlet aperture 228 will in most cases be directed or funneled by the shroud member, and particularly the transition portion 242, away from the labyrinth seal formed by second cylindrical portion 244 and recess 246 and to the periphery of the turbine 216. If the contaminant particle C is of a diameter substantially equal to that of the turbine drive apertures 232, if will pass therethrough without impeding the rotation of the turbine 216. If the contaminant particle C has any diameter larger than that of the turbine drive apertures 232, it will either be contained within the shroud 212 or, upon higher flow rates, discharged through the turbine bypass apertures 234 upon opening of valve member 236. Even if the contaminant particle C remains trapped within the shroud 216, malfunction will not occur as long as a substantial number of the turbine drive apertures 232 are not blocked by contaminants.

The only contaminant particles that have a chance of impeding rotation of the turbine 216 are those which could be wedged into the labyrinth seal. Inasmuch as the leakage through this labyrinth seal is greatly reduced from that of the prior art, due to the smaller leakage area afforded thereby, the probability of a contaminant particle being lodged therein also is reduced. Further, it will be readily appreciated that the radial clearances of the labyrinth seal affored by, for example, cylindrical portion 244 and recess 246, may be increased over that possible with the prior art to further reduce the possibility of contaminant blockage while yet maintaining the same or even better low flow rate capability.

In a test utilizing fuel contaminated with various particles, such as iron oxide, silica sand, coarse Arizona road dust, and cotton linters, which was supplied to mass flowmeters constructed as illustrated and described with respect to FIGS. 2 and 5, respectively, and under various test conditions including different proportions of contaminants and varying flow rates, the flowmeter constructed according to the teachings of FIG. 2 experienced 46 turbine stoppages, 34 of which required an external stimulus of restore operation. The flowmeter constructed according to FIG. 5 and in accordance with the teachings of the present invention, on the other hand, experienced no stoppages.

While the invention has been described generally with respect to mass flowmeters and with respect to a preferred embodiment of the invention usable with mass flowmeters, it is to be clearly understood by those skilled in the art that the invention is not limited thereto, but rather that the limits thereof are intended to be interpreted in accordance with the following claims.

What is claimed is:

1. An improved fluid flowmeter comprising:
   a. housing means defining therein a fluid measurement chamber and further including fluid inlet means and fluid outlet means situated, respectively, at opposite ends of said fluid measurement chamber for admitting fluid into and removing fluid from said fluid measurement chamber, said fluid inlet means thereby defining an inlet opening having a predetermined cross-sectional area;
   b. a fluid reaction means mounted within said fluid measurement chamber for rotation about an axis of revolution substantially aligned with said inlet opening and spaced apart from said inlet opening in the direction of fluid flow through said fluid measurement chamber, said fluid reaction means having a cross-sectional area in a direction transverse to the direction of fluid flow which is greater than said predetermined cross-sectional area of said inlet opening, said fluid reaction means further including a plurality of fluid reaction surfaces located radially outward of said axis of revolution for imparting rotational movement to said fluid reaction means;
   c. shroud means rotatable with said fluid reaction means and comprising a hollow member of revolution having a first end coupled to said fluid reaction means at points radially outward of said plurality of fluid reaction surfaces and tapering from said first end to a second end located in proximity to said inlet opening, and
   d. said fluid inlet means including sealing means surrounding said inlet opening for providing a rotatable fluid seal with said second end of said shroud means.

2. A flowmeter as recited in claim 1, wherein said second end of said shroud means and said sealing means provide a rotatable labyrinth fluid seal.

3. A flowmeter as recited in claim 2, wherein said shroud means includes a substantially cylindrical portion adjacent to and including said second end, and wherein said sealing means comprises an annular recess defined in said fluid inlet means and surrounding said inlet opening for receiving a part at least of said substantially cylindrical portion of said shroud means.

4. A flowmeter as recited in claim 1, wherein said fluid reaction means comprises a turbine having a peripheral surface of revolution, and wherein said fluid reaction surfaces comprise a plurality of turbine drive surfaces.

5. A flowmeter as recited in claim 4, wherein said shroud means includes a second, substantially cylindrical portion adjacent to and including said first end, a part at least of said second, substantially cylindrical portion fitting over and being secured to said peripheral surface of revolution of said turbine, and a transition portion between said substantially cylindrical portion and said second, substantially cylindrical portion and increasing in diameter in the direction of fluid flow from said second end to said first end.

6. A flowmeter as recited in claim 4, wherein said plurality of turbine drive surfaces are provided in part by a plurality of turbine drive apertures extending through said turbine at an angle with respect to said axis of revolution.

7. A flowmeter as recited in claim 4, wherein said flowmeter further includes a shaft supported for rotation in said housing means and thereby defining said axis of revolution, said turbine being secured to saif shaft; impeller means supported for rotation within said housing means; and means including a spring member coupling said impeller means to said shaft so that the impeller means rotates with but lags behind said shaft as a function of mass flow rate.

8. A flowmeter as recited in claim 7, wherein said turbine has a plurality of fluid bypass openings therein, separate from said turbine drive surfaces, which extend through said turbine, and further including a valve member adjacent said turbine and substantially covering said plurality of fluid bypass openings, said valve member being supported for rotation with said shaft and said turbine and deflecting in response to fluid pressure to yieldingly uncover said plurality of fluid bypass openings with increases in flow through said flowmeter.

9. An improved turbine means for a fluid flowmeter comprising:
a. a turbine member having a front surface, a back surface, an axis of revolution, and a peripheral surface of revolution, and a plurality of turbine drive surfaces located radially between said peripheral surface of revolution and said axis of revolution, and
b. shroud means comprising a hollow member or revolution having a first end coupled to and sealed with said turbine member at points radially outward of said plurality of turbine drive surfaces, and tapering in a direction away from said front surface of said turbine member to a second end having a lesser diameter than that of said peripheral surface of revolution which is adapted for forming part of a rotatable fluid seal.

10. A turbine means as recited in claim 9, wherein said shroud means comprises a first, substantially cylindrical portion adjacent to and including said second end, a second, substantially cylindrical portion adjacent to and including said first end, a part at least of said second cylindrical portion fitting over and being secured to said peripheral surface of revolution, and a transition portion between said first and said second substantially cylindrical portions and increasing in diameter in a direction parallel to said axis of revolution from said second end to said first end.

11. A turbine means as recited in claim 9, wherein said turbine member has a plurality of fluid bypass openings therein, separate from said plurality of tubine drive surfaces, which extend through said turbine means from said front surface to said back surface, and further comprising a spring valve plate member having a plurality of spring members each aligned with one of said plurality of fluid bypass openings, and means holding said spring valve plate member against said back surface of said turbine member for rotation therewith with said spring members yieldingly covering said plurality of fluid bypass openings.

* * * * *